US006957540B1

(12) United States Patent
Briesch et al.

(10) Patent No.: US 6,957,540 B1
(45) Date of Patent: Oct. 25, 2005

(54) MULTI-MODE COMPLEX CYCLE POWER PLANT

(75) Inventors: Michael S. Briesch, Orlando, FL (US); Robert M. Mitchell, Winter Springs, FL (US)

(73) Assignee: Siemens Westinghouse Power Corporation, Orlando, FL (US)

( * ) Notice: Subject to any disclaimer, the term of this patent is extended or adjusted under 35 U.S.C. 154(b) by 0 days.

(21) Appl. No.: 10/833,411

(22) Filed: Apr. 28, 2004

(51) Int. Cl.[7] .............................. F02C 1/00
(52) U.S. Cl. .................. 60/772; 60/39.181; 60/39.182
(58) Field of Search ................. 60/39.181, 39.182, 60/772

(56) References Cited

U.S. PATENT DOCUMENTS

| | | | | |
|---|---|---|---|---|
| 3,675,426 A | * | 7/1972 | Vidal et al. ............... | 60/39.182 |
| 3,769,795 A | * | 11/1973 | Rostrom ...................... | 60/665 |
| 4,136,643 A | * | 1/1979 | Aguet ........................ | 122/7 B |
| 4,841,722 A | * | 6/1989 | Bjorge ..................... | 60/39.182 |
| 4,858,562 A | * | 8/1989 | Arakawa et al. ............ | 122/7 R |
| 4,896,496 A | * | 1/1990 | Zervos ........................ | 60/772 |
| 5,044,163 A | * | 9/1991 | Bruckner et al. ............. | 60/677 |
| 5,375,410 A | | 12/1994 | Briesch et al. | |
| 5,442,908 A | | 8/1995 | Briesch et al. | |
| 5,678,401 A | * | 10/1997 | Kimura ................... | 60/39.182 |
| 6,145,295 A | * | 11/2000 | Donovan et al. ............. | 60/783 |
| 6,200,128 B1 | * | 3/2001 | Kobayashi ..................... | 431/5 |
| 6,220,013 B1 | * | 4/2001 | Smith .......................... | 60/783 |
| 6,220,014 B1 | * | 4/2001 | Wada et al. ................... | 60/778 |
| 6,244,033 B1 | * | 6/2001 | Wylie ........................... | 60/783 |
| 6,286,297 B1 | * | 9/2001 | Wakazono et al. ............ | 60/783 |
| 6,389,797 B1 | * | 5/2002 | Sugishita et al. ......... | 60/39.182 |
| 6,405,537 B1 | * | 6/2002 | Wada et al. ................... | 60/778 |
| 6,438,939 B1 | * | 8/2002 | Uematsu et al. ......... | 60/39.182 |
| 6,449,954 B2 | * | 9/2002 | Bachmann .................. | 60/775 |
| 6,463,741 B1 | * | 10/2002 | Frutschi ....................... | 60/780 |
| 6,529,849 B2 | * | 3/2003 | Umezawa et al. .......... | 702/136 |
| 6,530,208 B1 | * | 3/2003 | Sugishita et al. ........ | 60/39.182 |
| 6,546,713 B1 | * | 4/2003 | Hidaka et al. ........... | 60/39.182 |
| 6,604,354 B2 | * | 8/2003 | Oto et al. ................ | 60/39.182 |
| 6,615,575 B2 | * | 9/2003 | Liebig ..................... | 60/39.182 |

* cited by examiner

Primary Examiner—William H. Rodriguez

(57) ABSTRACT

A power plant (10) including a boiler unit portion (12) and a gas turbine unit portion (14) operable in multiple modes, including operation of the boiler unit portion independent of the gas turbine unit portion. Exhaust gas from the gas turbine is cooled in a heat recovery steam generator (HRSG) (52, 54) where steam is produced. The exhaust gas may also be provided to support combustion in a separately fueled boiler (16). The exhaust gas may be extracted from any location within or downstream of the HRSG. Steam produced in the HRSG and/or in the boiler may be supplied to a steam turbine unit (42, 44, 46). Dampers (60, 62, 74) are provided to selectively direct the gas turbine exhaust to the boiler or to bypass the boiler. An existing boiler fired steam power plant may be reconfigured to have the described arrangement.

16 Claims, 3 Drawing Sheets

MULTI-MODE COMPLEX CYCLE POWER PLANT

FIELD OF THE INVENTION

This invention relates generally to the field of power generation, and more particularly to the field of combined cycle power plants.

BACKGROUND OF THE INVENTION

U.S. Pat. No. 5,375,410 describes a combined combustion and steam turbine power plant that includes a steam turbine unit, a boiler unit for supplying a first supply of steam to the steam turbine unit, and a gas turbine (combustion turbine) unit including a heat recovery steam generator for providing a second supply of steam to the steam turbine unit. The prior art plants are started by first starting the gas turbine unit, thereby establishing exhaust airflow through the exhaust gas duct structure. Once the airflow is established through the duct structure, a portion of the airflow can be directed to the boiler to support the operation of the boiler. Combustion in the boiler is supported by the "clean" exhaust from the gas turbine combustor, which still contains a significant amount of oxygen in spite of the combustion occurring within the gas turbine combustor. The compressor of the gas turbine unit thus provides the motive force for the boiler combustion air, and operation of the entire plant is predicated upon the availability of the gas turbine unit. The boiler unit cannot be operated separately from the gas turbine unit.

DETAILED DESCRIPTION OF THE INVENTION

The power plant of the present invention combines a steam turbine unit, a boiler unit and a gas turbine unit into a highly efficient Brayton/Rankine cycle arrangement that provides improved operational flexibility when compared to prior art power plants such as described in U.S. Pat. No. 5,375,410, incorporated by reference herein.

The present invention provides a multi-mode complex cycle power plant. In this context, the term "complex cycle" is meant to include power plants that include a Brayton cycle gas turbine portion, and a Rankine cycle steam turbine portion drawing heat energy from both the gas turbine exhaust (via heat recovery steam generators) and from a separately fired boiler. Further in this context, the term "multi-mode" is used to describe the selective operation of the gas turbine portion of the plant alone; operation of the boiler portion of the plant alone; or simultaneous operation of the gas turbine and boiler portions of the plant. The operation of the boiler of the present invention is not dependent upon the availability of the gas turbine unit, as is required in the prior art plant.

Figure 1:
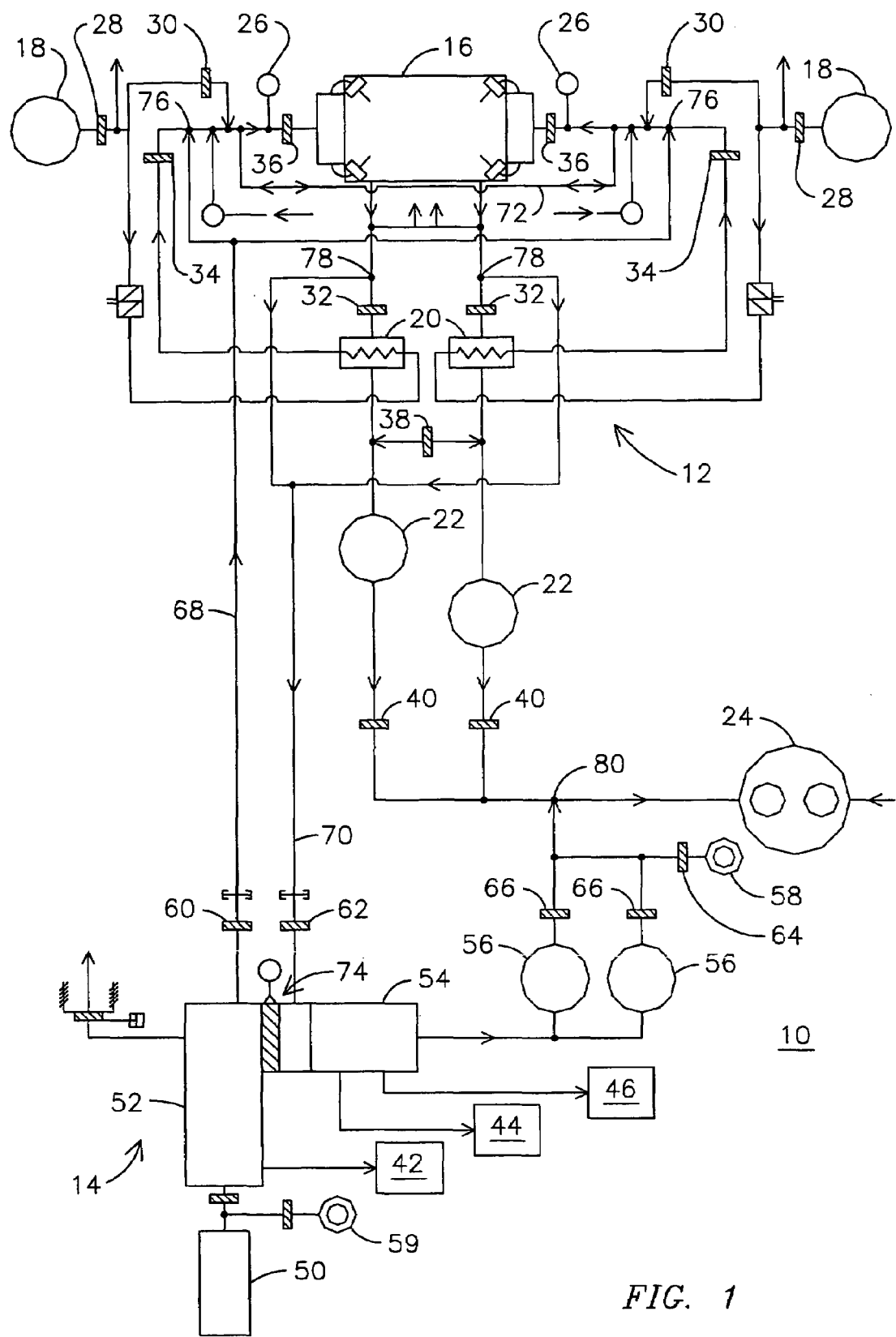
FIG. 1 is a schematic illustration of an exemplary power plant illustrating the flow paths and utilization of air used in the combustion process.
Figure 2:
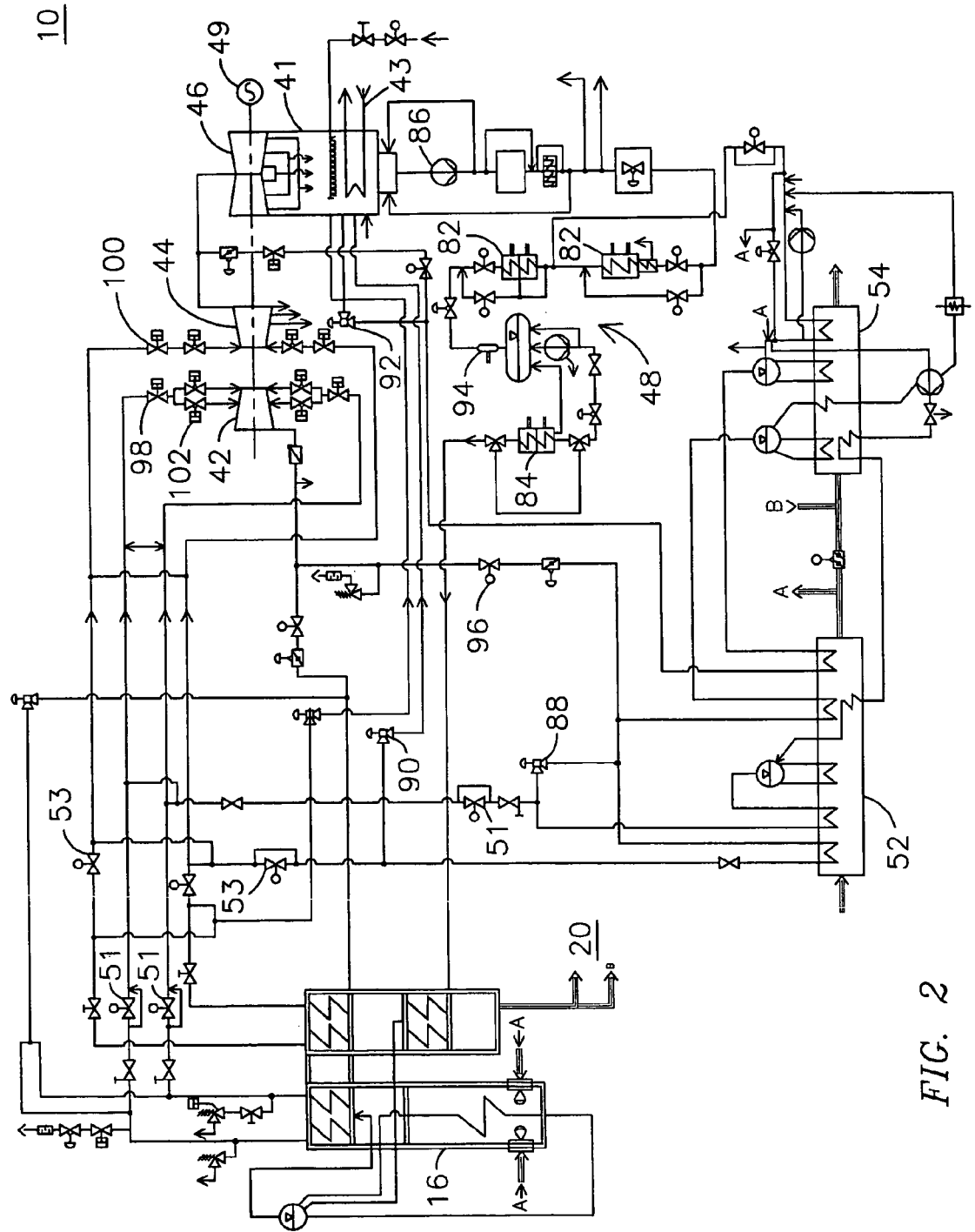
FIG. 2 is a schematic illustration of the steam/water systems of the exemplary power plant of FIG. 1.

One embodiment of a power plant 10 in accordance with the present invention is illustrated in FIGS. 1 and 2. FIG. 1 illustrates the flow paths and utilization of combustion air. For purposes of simplification and clarity, most of the steam/water flow paths and steam/water system components are not illustrated in FIG. 1. FIG. 2 provides a schematic illustration of the water/steam systems of the power plant 10.

The power plant 10 includes a boiler unit portion 12 and a gas turbine unit portion 14, each separately fueled and operable alone or in conjunction with the other portion. The boiler unit portion includes a boiler 16, forced draft fans 18 for providing fresh air to the boiler 16 through regenerative air heaters 20, induced draft fans 22 for drawing combustion air from the boiler to ensure that the boiler is maintained at a desired low air pressure, and an exhaust stack 24 for discharging the combustion air to the atmosphere. A boiler fuel supply 26 mixes combustible fuel with the fresh air being supplied to the boiler. The fuel burned in the boiler 16 may typically be a heavy fuel oil or other relatively low quality fuel. A plurality of dampers 28, 30, 32, 34, 36, 38, 40 are provided for the control of various airflows, as may be described more fully below. The boiler 16 heats a supply of feedwater provided from condenser 41 through a series of feedwater heaters 48 to provide steam to a steam turbine unit; in this embodiment both high pressure steam to a high pressure steam turbine 42 and intermediate pressure steam to an intermediate pressure steam turbine 44. The steam turbines are typically joined by a common shaft to power an electrical generator 49.

The gas turbine unit portion 14 of plant 10 includes a gas turbine assembly 50. Although not illustrated in such detail, the gas turbine assembly 50 is known in the art to include: a compressor for receiving and compressing fresh air; a combustor for producing and combusting a mixture of a combustible fuel and the compressed air to produce hot combustion air; and a gas turbine for expanding the hot combustion air to produce mechanical energy. The mechanical energy is typically used to drive an electrical generator, which may or may not be the same generator 49 driven by the steam turbine unit. The fuel burned in the gas turbine assembly 50 may typically be natural gas or other relatively high quality fuel.

Exhaust from the gas turbine 50 is ducted through a high-pressure heat recovery steam generator (HP-HRSG) 52 where heat from the exhaust gas is transferred to convert feedwater into high-pressure steam for delivery to the high-pressure steam turbine 42. Appropriate isolation valves 51 are provided in the steam lines so that the high pressure steam turbine 42 may be supplied steam selectively from the boiler 16 and/or the HP-HRSG 52.

The gas turbine exhaust is then directed through modulating damper 74 to an intermediate pressure/low pressure heat recovery steam generator (IP/LP-HRSG) 54 where additional heat is extracted to produce intermediate pressure and low pressure steam for delivery to the intermediate pressure steam turbine 44 and a low pressure steam turbine 46. The modulating damper 74 has full open, full closed and intermediate positions for modulating the flow there through. The intermediate and low-pressure steam may be further heated in the HP-HRSG 52 prior to delivery to the respective turbines 44, 46. Appropriate isolation valves 53 are provided in the steam lines so that the intermediate pressure steam turbine 44 may be supplied steam from the boiler 16 and/or the IP/LP-HRSG 54. One skilled in the art will realize that the intermediate pressure and low pressure HRSG's may be integrated into a single component or they may be separate components, and that in certain embodiments not all of the HP, IP and LP steam circuits may be provided or utilized. The spent exhaust gas is then drawn through induced draft fans 56 and delivered to exhaust stack 24. In some embodiments, an excess flow exhaust stack 58 may be used to augment the capacity of exhaust stack 24. A plurality of dampers 60, 62, 64, 66 are provided for the control of various airflows, as may be described more fully below.

The power plant 10 may be used to generate power by operating either the boiler unit portion 12 or the gas turbine unit portion 14 or both simultaneously. For boiler-only operation, forced draft fans 18 and induced draft fans 22 provide the motive force for the combustion air. For gas turbine-only operation, the compressor of the gas turbine assembly 50 and the induced draft fans 56 provide the motive force for the combustion air. The exhaust stack 24 is illustrated as being a common component in these two airflow pathways, since the stack is a passive component that has very high reliability. However, if desired, separate exhaust stacks such as 24, 58 may be provided for the boiler unit portion 12 and for the gas turbine unit portion 14. A bypass exhaust stack 59 may optionally be provided for bypassing the gas turbine exhaust around the HRSG's 52, 54 and directly to the atmosphere. For hybrid boiler-gas turbine operation, the primary supply of combustion air for the boiler 16 may be the gas turbine exhaust supplied via air duct 68, and the forced draft fans 18 may be idle or may be used only to supply a supplemental supply of fresh air. The "clean" gas turbine exhaust gas is supplied as combustion air to the boiler 16 as an alternative to, or as a supplement for, the air supplied by forced draft fans 18. The "dirty" exhaust from the boiler 16 may be returned to just upstream of the IP/LP-HRSG 54 via air duct 70. The power level that can be generated in the boiler 16 during hybrid operation may be limited by the amount of oxygen available in the exhaust from the gas turbine assembly 50. Supplemental fresh air from the forced draft fans 18 or a separate supplemental fresh air supply (not shown) may be desirable. This may be accomplished by operating only one of two forced draft fans 18, with the flow to the two sides of boiler 16 being balanced via equalization duct 72 and control of the position of dampers 36. Induced draft fans 22 may be idle during hybrid operation, with that function being supplied by induced draft fans 56 of the gas turbine unit portion 14.

Hybrid operation may be initiated by starting the induced draft fans 56, then firing the gas turbine assembly 50. At this stage the modulating damper 74 and dampers 60, 62 are positioned to direct all of the airflow produced by gas turbine assembly 50 toward the induced draft fans 56. Boiler operation is then initiated by gradually increasing the air flow through the boiler 16 via air ducts 68, 70 as the boiler is fired and increased in power level. Atmospheric air typically includes about 21% oxygen, whereas the exhaust from the gas turbine assembly may include about 13% oxygen, thus limiting the power level that can be produced in the boiler 16. The oxygen content supplied to the boiler 16 may be increased by the operation of forced draft fans 18 if desired. In one embodiment, the gas turbine unit portion 14 may be capable of generating 170–180 megawatts of power when operated alone (depending upon atmospheric conditions), and the boiler unit portion 12 may be capable of generating 350 megawatts of power when operated alone. In hybrid mode operation, the heat recovery steam generators provide a portion of the steam required by the steam turbines, and the power output of the boiler can be reduced accordingly. If one portion of the plant 10 is inoperable due to equipment failure, maintenance requirements, administrative constraints, etc., the power demand may still be at least partially satisfied by the operation of the available portion of the plant. Maintenance activities may be conducted on one portion of the plant 10 while the other portion of the plant 10 is operated and producing power.

One skilled in the art may appreciate that the operational flexibility provided by power plant 10 may be exploited in a number of ways. In one embodiment where two different types of fuel are used for the boiler 16 and the gas turbine assembly 50, the operator may select the appropriate mode of operation for achieving a desired power output level with a minimum fuel cost. Furthermore, the operator may select the appropriate mode of operation for achieving a desired power output level with a minimum of exhaust emissions, or with consideration given to both fuel cost and emissions. This flexibility is not limited by a requirement that the gas turbine unit must be operating in order to operate the boiler unit, as in prior art plants.

The present invention may be applied advantageously as an upgrade to an existing boiler power plant. It is not uncommon in the power industry for the owner of a boiler-fired steam power plant to desire to modify the plant to include a combined cycle gas turbine unit portion. Such upgrades have traditionally been driven by a change in fuel cost, by a change in emissions regulations, or by a change in power demand. The prior art solution for such upgrades was a plant such as the one described in U.S. Pat. No. 5,375,410. The construction activity required for such an upgrade required the removal of key components of the boiler power plant, such as the regenerative air heaters, forced draft and induced draft fans, and associated dampers and ductwork. The boiler plant was rendered inoperative during the entire construction process, and once construction was completed, the operation of the plant depended upon the availability of the gas turbine unit portion. The power plant 10 of the present invention may be constructed as an upgrade of an existing boiler-fired power plant with much less impact to the availability of the plant. In such an embodiment, the existing plant includes forced draft fans 18, boiler 16, regenerative air heaters 20, induced draft fans 22, exhaust stack 24, dampers 28, 30, 34, 36 and 40 and associated ductwork. In order to add the equipment for the gas turbine unit portion 14, a limited number of connections to this system are required. Typical interconnections include: the interconnections 76, 78 for ducts 68, 70 respectively; the interconnection 80 for the outlet of the induced draft fans 56; and the installation of new dampers 32. The operation of the boiler unit portion 12 can proceed independently of the construction and testing of the gas turbine unit portion 14 with the exception of the time required for creating the interconnections at 76, 78, 80 and 32. The power generated by the plant 10 during the installation and testing of the gas turbine unit portion 14 will generate revenue that may significantly reduce the net cost of the upgrade when compared to the installation of a prior art design. Furthermore, the new gas turbine unit portion 14 can be thoroughly tested to detect and to eliminate typical start-up problems without impacting the availability of the boiler unit portion 12. Once in operation, the power plant 10 will have improved availability when compared to the prior art design because a failure in the gas turbine unit portion 14 will not require the plant to be totally shut down, since the boiler unit portion 12 may continue to operate without reliance upon the gas turbine unit portion 14.

In an exemplary embodiment, a 350 MW oil-fired boiler/steam turbine power plant is modified to add a 170 MW Model W501 F gas-fired gas turbine unit as supplied by Siemens Westinghouse Power Corporation. The gas turbine unit portion 14 is a combined cycle system including a split HRSG 52, 54 used to supply steam to the existing steam turbine unit 42, 44, 46. The existing steam turbines should need no modification, however, the turbine designs should be checked to confirm the acceptability of long-term operation with proportions of HP/IP/LP steam that may be different than during the operating of the boiler unit alone. The boiler burners may need to be modified to accommodate operation with the relatively lower oxygen content of the gas turbine exhaust. A 100% steam dump capacity may be added to allow full flow to the existing condenser 41 so that the gas turbine exhaust can be cooled in the HRSG's 52, 54 without using the resulting steam in the steam turbine during a simple cycle mode of operation. The condenser circulating water system 43 should need no modification that affects performance. The high-pressure heat recovery steam generator 52 reduces the gas turbine exhaust temperature to a level that is acceptable for introduction into the existing boiler 16. Motorized dampers 32 40 are positioned to bypass the existing regenerative air heaters 20 during hybrid operation to allow the LP/IP heat recovery steam generator 54 to cool the exhaust to the lowest practical limit given sulfur, cost and layout limitations. Electrical switchyard equipment may be added/modified to accommodate the addition of the electrical generator driven by the gas turbine unit. The plant control system must be upgraded to permit the operation of the plant in any mode of operation.

The modified plant 10 of the exemplary embodiment may be operated in its existing mode (EM) where the boiler unit portion 12 is operated alone; in a combined cycle mode (CC) where the gas turbine unit portion 14 is operated with the HRSG's generating steam for the steam turbines while the boiler unit portion 12 is not operated; in a hybrid mode (HM) with both the gas turbine unit portion 14 and boiler unit portion 12 operating simultaneously; and in a simple cycle mode (SC) where the gas turbine assembly 50 is operated without the HRSG's and without the boiler unit portion 12 being operated. The simple cycle mode may be accomplished by bypassing the gas turbine exhaust directly to atmosphere through the bypass exhaust stack 59. The control system in the exemplary embodiment may be configured to transfer the operating mode of the plant between various modes, such as: CC to HM; HM to CC; CC to SC; HM to EM, etc. as desired by the owners/operators of the plant. Because the gas turbine unit portion 14 will generate less undesirable emissions than the boiler unit portion 12 on a ton/MW basis, the plant may be optimized for HM operation, with the SC and CC modes being available for start-up low load operation and the EM mode being available as a back up if the gas turbine unit portion 14 or fuel for that portion is not available.

In the exiting mode of operation (EM), the oil-fired boiler 16 supplies high pressure and reheat steam to the existing steam turbine unit. Condensate and feedwater is heated in the LP and HP feedwater heaters 82, 84. The boiler flue gas temperature is reduced to desired outlet conditions by the regenerative air heaters 20. The gas turbine unit portion 14 is shut down and isolated from the operating systems. Dampers 60, 62 are placed in a closed position in this mode. The plant may produce up to its originally designed 100% power level of 350 MW.

In the combined cycle mode of operation (CC), the gas-fired gas turbine unit portion 14 supplies high pressure, reheat and low pressure steam to the existing steam turbine unit 42, 44, 46. The existing condensate extraction pump(s) 86 provide "cold" condensate to the new HRSG 52, 54. The LP and HP feedwater heaters 82, 84 may be operated as required. The boiler 16 is shut down and isolated from the operating systems. Dampers 60, 62 are placed in a closed position in this mode. The plant may produce up to 100% of its combined cycle design power level of 260 MW, approximately two-thirds of which is generated by the gas turbine assembly 50 and one-third of which is generated by the steam turbines.

In the hybrid mode of operation (HM), both the oil-fired boiler 16 and the HRSG 52, 54 supply high pressure, reheat and low pressure steam to the existing 350 MW steam turbine unit. The gas turbine exhaust is supplied as boiler combustion air via air duct 68 from the HP HRSG 52 at approximately 315° C. (600° F.). Dampers 60, 62 are placed in an open position in this mode, and modulating damper 74 is positioned at a desired position between full open and full closed to achieve a desired split of the exhaust gas flow through ductwork 68, 70 and directly to IP/LP HRSG 54. Supplemental air may be provided to the boiler to increase the available oxygen content via the existing forced draft fans 18 or via a dedicated supplemental fresh air system (not shown). The boiler flue gas bypasses the regenerative air heaters 20 via duct 70, mixes with the gas turbine exhaust gas from the HP HRSG 52, and is directed to the IP/LP HRSG 54 where it is cooled to a desired exhaust stack temperature. Condensate and feedwater is heated in the LP and HP feedwater heaters 82, 84. Condensate for the HRSG 52, 54 is extracted downstream of the LP heater 82. In this mode, the boiler and HRSG steam systems are interconnected, and the boiler 16 is operated at less than its rated output in order to fully load the steam turbine unit. Power output from the steam turbines and gas turbine combined is about 500 MW in this mode.

In the combined cycle mode of operation (CC), the gas turbine unit portion 14 may be operated in bypass mode with the heat recovery steam generators being in bypass operation. High-pressure steam is directed to the cold reheat system via high-pressure bypass valve 88. Reheat and low pressure steam is directed to the condenser 41 via hot reheat valve 90 and low-pressure bypass valve 92. The existing condensate extraction pump 86 provides condensate to the HRSG 52, 54. The LP and HP feedwater heaters 82, 84 are not in operation, although the LP heater 82 may be pressurized. The boiler 16 is shut down and isolated from the operating systems. The gas turbine assembly 50 produces up to its rated output of 170 MW. In simple cycle mode (SC) the gas turbine 50 is operated with the HRSG's 52, 54 isolated and the exhaust being directed to stack 59.

The plant of the exemplary embodiment may be started from a cold shutdown condition to the hybrid mode of operation by the following exemplary procedure.

HRSG and boiler purge cycle: First, the HRSG and boiler are purged with cold purge air such as required under appropriate fire protection codes and/or other safety guidelines. The cold purge air may be provided by the gas turbine prior to ignition and induced draft fans 22.

Gas turbine/HRSG start-up: The gas turbine and HRSG are then started. The gas turbine assembly 50 is then ignited, accelerated to synchronous speed, and ramped up to a predetermined minimum load such as 25% load. The gas turbine exhaust warms the HRSG 52, 54 and the boiler 16 with the induced draft fans 22 in operation. The HRSG begins to produce high pressure steam which is vented to the atmosphere if the condenser 41 is not available. The steam pressure is increased according to the high pressure steam drum ramp limits. If the condenser is available, the HRSG is transferred to bypass operation. The gas turbine is ramped up to 70% power and the steam pressure is increased to the required steam turbine start conditions. In one embodiment these conditions are: HP steam approximately 1,000 psig/65 barg; hot reheat steam approximately 220 psig/15 barg; and temperature approximately 370° C. (700° F.).

Boiler start-up: With the gas turbine exhaust gas flow (and supplemental fresh air flow as appropriate) established to the boiler, the boiler burners are ignited during the HRSG start-up described above. Boiler power is ramped upward according to the plant procedures used before conversion of the plant, and the steam produced is vented to the atmosphere or dumped to the condenser, if available. The steam systems of the boiler are isolated at this time from the HRSG systems. The boiler load is ramped up to approximately 20–30% to achieve the required steam turbine start conditions. The existing deaerator 94 is pegged to a minimum temperature according to plant procedures used before conversion of the plant.

Steam turbine and piping warm-up: The HRSG is started with the HP isolation valves 51, HRH isolation valve 53 and CRH isolation valve 96 open to warm the existing high pressure and reheat piping close to the isolated boiler systems. The high pressure and hot reheat piping uses warm-up bypass valves located close to the steam turbine isolation valves 98, 100 so that the steam turbine valves are warmed up concurrently with the warming of the piping.

Steam turbine start-up: The steam turbine is rolled and started with steam from the HRSG. The existing steam turbine start-up procedure may have to be modified from the existing boiler start-up procedure due to higher cold reheat pressure (HP turbine back pressure). The steam turbine is loaded according to allowable ramp rates until all available HRSG steam is utilized and the HRSG bypass valves 88, 90, 92 are closed.

The plant of the exemplary embodiment may be started from a cold shutdown condition to the combined cycle mode of operation by following the above procedure except that the boiler is kept isolated from the operating systems.

The plant of the exemplary embodiment may be shutdown from the hybrid mode of operation by the following exemplary procedure. The boiler is unloaded to a minimum power level (less than 500° C./930° F. HP and HRH temperature) and the gas turbine and HRSG are ramped to approximately 70% power. The steam turbine is then shut down by closing the HP/IP/LP control valves 102/104/106. The boiler and HRSG are transferred to bypass operation with the steam systems isolated. The boiler is shut down according to standard practice (except for bypass valve operation) and the boiler is purged with gas turbine exhaust gas. The boiler is then isolated from the gas turbine exhaust gas system and the induced fan is shut down. This places the plant in combined cycle/bypass mode, and further steps in the shutdown process from this condition are described below.

The plant of the exemplary embodiment may be shutdown from the combined cycle mode of operation by the following exemplary procedure. The gas turbine and HRSG are unloaded to approximately 70% load. The steam turbine is then shut down by closing the HP/IP/LP control valves 102/104/106. The gas turbine 50 is transferred to bypass operation with the steam systems isolated. This places the plant in simple cycle mode, and further steps in the shutdown process from this condition are described below.

The plant of the exemplary embodiment may be shutdown from the simple cycle mode of operation by the following exemplary procedure. The gas turbine is unloaded to a minimum load within allowable steam drum/superheater header ramp rates. The gas turbine is tripped while the steam bypass valve controls remain in operation to avoid an undesirable pressure increase. After the gas turbine is placed on turning gear, the HRSG exhaust gas dampers 60, 62, 66 are closed.

In addition to normal operations, the exemplary plant 10 of the present invention can accommodate various plant trip conditions, as discussed more fully below.

Steam turbine trip: Upon a steam turbine trip, the boiler and gas turbine are rapidly unloaded to respective minimum loads, such as approximately 20% boiler load and 70% gas turbine load (if the condenser can handle such a load). The boiler and HRSG are transferred to bypass operation with the steam systems isolated and the LP and HP feedwater heaters loosing extraction steam. The deaerator 94 is pegged with cold reheat steam. The boiler may then continue to be operated or it may be shut down.

Boiler trip: Upon a boiler trip, the boiler steam systems are isolated and transferred to bypass operation. The steam turbine controls the seam pressure decrease. The HP steam turbine exhaust temperatures may increase and a steam turbine trip may be initiated.

Gas turbine/HRSG trip: If the plant is operating in hybrid mode, the boiler is tripped in accordance with the above-described procedure in response to a gas turbine/HRSG trip. The steam turbine is then tripped in accordance with the above-described procedure.

Condenser trip: In response to a condenser trip, the steam turbine is tripped in accordance with the above-described procedure. The boiler is then tripped and the gas turbine/HRSG are tripped.

Figure 3:
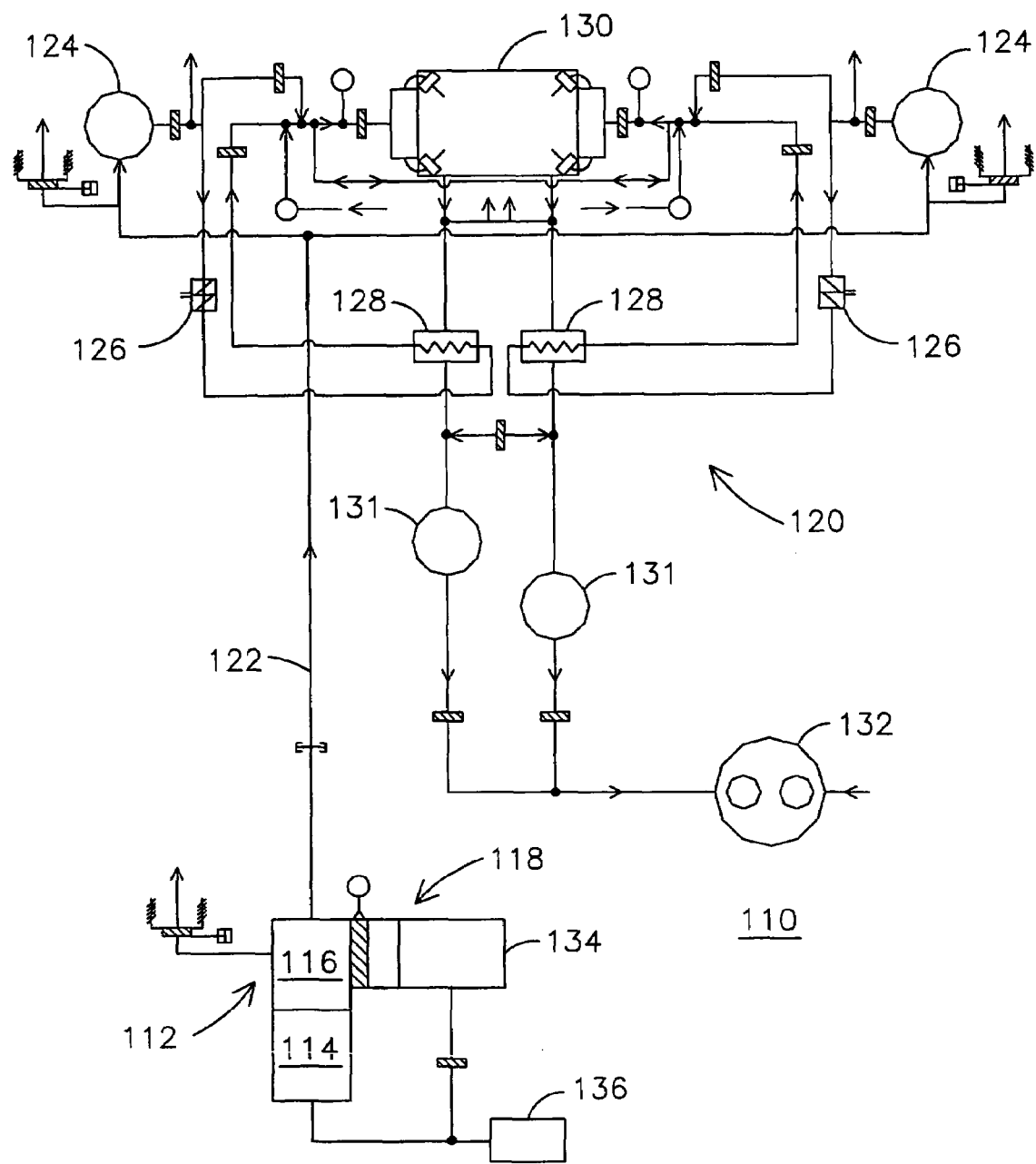
FIG. 3 is a schematic illustration of a second exemplary power plant illustrating the flow paths and utilization of air used in the combustion process.

While the embodiment of FIG. 1 shows the "clean" exhaust being taken from the gas turbine unit portion for use in the boiler from a location between the HP and the IP/LP portions of a split HRSG, it may be appreciated that other embodiments may utilize clean exhaust taken from any portion of the HRSG. FIG. 3 illustrates an embodiment of a multi-mode complex cycle power plant 110 incorporating a heat recovery steam generator 112 having integral high pressure and intermediate pressure sections 114, 116. In this embodiment, the combustion air for the boiler 16 is extracted from the gas turbine unit portion 118 for use in the boiler unit portion 120 via duct 122 connected downstream of the HRSG 112. Duct 122 may be fluidly connected to an inlet of forced draft fans 124. After the air passes through the boiler 16 it is directed to exhaust stack 132 via induced draft fans 131. The combustion air may optionally be heated in a steam air heater 126 and/or regenerative air heater 128 before being introduced into the boiler 130. In an embodiment of a 350 MW boiler unit portion 122 and a 170 MW Model W501 F gas turbine unit portion 118, the temperature of the clean exhaust leaving the HRSG 112 may be about 200° F. Operation of the steam air heaters 126 may be desired when the gas turbine unit portion 118 is operated with the boiler 130 being unfired in a stand-by mode in order to maintain the boiler at a desired temperature higher than the HRSG exhaust temperature, in order to enable rapid startup of the boiler 130.

The arrangement of the power plant 110 of FIG. 3 offers several advantages for an embodiment where an existing boiler unit portion 122 is modified to add a gas turbine unit portion 118. For example, because the combustion air for the boiler 130 is taken downstream of the HRSG 112, no return duct is needed to return the exhaust from the boiler 130 to the HRSG 112, thereby simplifying the interconnection between the boiler and gas turbine unit portions 122, 118. In this embodiment no "dirty" exhaust is passed through any part of the HRSG 112. Furthermore, if a separate exhaust stack 134 is provided for the gas turbine unit portion 118, the cost of such a stack may be relatively low because it is used to handle only the relatively "clean" exhaust of the gas turbine engine 136 and therefore may have a lower height than the boiler unit portion exhaust stack 132. When the plant 110 is operated in a combined cycle mode with the boiler unit portion 120 isolated, the exhaust from the gas turbine 136 is directed to exhaust stack 134 where it escapes via natural draft without the need for an induced draft fan. Additional fans and dampers may be required for various embodiments depending upon the specific design and equipment details of a particular project. For example, and additional dampers and/or fans may be required upstream of the forced draft fan 124 in order to accomplish a desired mix of combustion turbine exhaust gas and fresh air into the forced draft fan 124.

While various embodiments of the present invention have been shown and described herein, it will be obvious that such embodiments are provided by way of example only. Numerous variations, changes and substitutions may be made without departing from the invention herein. Accordingly, it is intended that the invention be limited only by the spirit and scope of the appended claims.

What is claimed is:

1. A power plant comprising:
   a gas turbine unit portion comprising a gas turbine assembly moving gas turbine exhaust gas through a heat recovery steam generator for generating steam during independent operation of the gas turbine unit portion;
   a boiler unit portion comprising a fan moving gas through a boiler to support combustion for generating steam during operation of the boiler unit portion independent of the gas turbine unit portion; and
   an interconnection between the gas turbine unit portion and the boiler unit portion for selectively moving gas turbine exhaust gas from the gas turbine unit portion through the boiler to support combustion to generate steam in both the heat recovery steam generator and the boiler during simultaneous operation of the gas turbine unit portion and the boiler unit portion.

2. The power plant of claim 1, further comprising:
   a duct interconnecting the heat recovery steam generator of the gas turbine unit portion with the boiler of the boiler unit portion for conveying gas turbine exhaust gas there between: and
   a damper controlling gas turbine exhaust gas flow through the duct and having a closed position for selecting independent operation of the gas turbine unit portion or independent operation of the boiler unit portion, and having an open position for simultaneous operation of the gas turbine unit portion and the boiler unit portion.

3. The power plant of claim 2, further comprising;
   the duct having an inlet between a high pressure portion of the heat recovery steam generator and an intermediate pressure portion of the heat recovery steam generator; and
   a modulating damper disposed between the high pressure portion of the heat recovery steam generator and the intermediate/low pressure portion of the heat recovery steam generator, the modulating damper having full open, full closed and intermediate positions for modulating the air flow there through.

4. The power plant of claim 1, further comprising:
   a duct receiving gas turbine exhaust gas from a high pressure portion of the heat recovery steam generator and fluidly connected to an inlet of the boiler of the boiler unit portion; and
   a duct receiving boiler exhaust gas from the boiler and delivering the boiler exhaust gas to an intermediate pressure portion of the heat recovery steam generator.

5. The power plant of claim 4, further comprising an exhaust stack fluidly connected to the boiler for receiving the boiler exhaust gas from the boiler and fluidly connected to the heat recovery steam generator for alternatively receiving the gas turbine exhaust gas from the gas turbine section portion.

6. The power plant of claim 5, further comprising an induced draft fan fluidly connected between the heat recovery steam generator and the exhaust stack.

7. The power plant of claim 1, further comprising a duct providing gas turbine exhaust gas to the boiler unit portion from a location downstream of the heat recovery steam generator.

8. The power plant of claim 7, wherein the duct is fluidly connected to a suction side of a forced draft fan of the boiler unit portion.

9. The power plant of claim 7, further comprising a heater fluidly connected between the duct and the boiler of the boiler unit portion for maintaining the boiler at a desired temperature during a period of operation when the boiler is not fired.

10. The power plant of claim 7, further comprising:
    an exhaust stack for receiving only the gas turbine exhaust gas from the gas turbine unit portion; and
    an exhaust stack for receiving the boiler exhaust gas from the boiler unit portion.

11. A method of upgrading a steam boiler power plant, the steam boiler power plant having a fan for providing air to support combustion in a boiler to produce boiler exhaust gas, the method comprising:
    providing a gas turbine unit portion;
    providing an interconnection between the gas turbine unit portion and the boiler of the steam boiler power plant to convey gas turbine exhaust gas to the boiler during simultaneous operation of the boiler and the gas turbine unit portion; and
    providing a means for isolating the boiler from the gas turbine unit portion when the boiler is operated independently of the gas turbine unit portion.

12. The method of claim 11, further comprising:
    providing a supply duct fluidly connected between the boiler and a location downstream of a high pressure heat recovery steam generator of the gas turbine unit portion; and
    providing a return duct fluidly connected between the boiler and a location upstream of an intermediate pressure heat recovery steam generator of the gas turbine portion.

13. The method of claim 11, further comprising providing a supply duct fluidly connected to the boiler from a location downstream of a heat recovery steam generator of the gas turbine unit portion.

14. The method of claim 13, further comprising connecting the supply duct to a location upstream of a heater for warming gas turbine exhaust gas delivered through the duct before it enters the boiler.

15. The method of claim 11, wherein the steam boiler power plant comprises an existing exhaust stack receiving boiler exhaust gas from the boiler, and further comprising:
    providing a new exhaust stack for receiving only gas turbine exhaust gas from the gas turbine unit portion; and exhausting the gas turbine exhaust gas to atmosphere through the existing exhaust stack during simultaneous operation of the boiler and the gas turbine unit portion; and exhausting the gas turbine exhaust gas to atmosphere through the new exhaust stack when the gas turbine unit portion is operated independently of the boiler.

16. The method of claim 11, further comprising continuing operation of the steam boiler power plant during the step of providing a gas turbine unit portion except not during the step of providing an interconnection.

* * * * *